United States Patent
Eidson et al.

(10) Patent No.: US 9,177,077 B2
(45) Date of Patent: Nov. 3, 2015

(54) METHOD FOR IMPROVING BACKWARD/FORWARD PERFORMANCE BETWEEN CERTAIN TYPES OF DYNAMIC WEB PAGES

(71) Applicant: Apple Inc., Cupertino, CA (US)

(72) Inventors: Brady K. Eidson, San Jose, CA (US); Alice Liu, Santa Clara, CA (US); Ada Y. Chan, San Jose, CA (US)

(73) Assignee: Apple Inc., Cupertino, CA (US)

( * ) Notice: Subject to any disclaimer, the term of this patent is extended or adjusted under 35 U.S.C. 154(b) by 435 days.

(21) Appl. No.: 13/628,018

(22) Filed: Sep. 26, 2012

(65) Prior Publication Data

US 2013/0275853 A1    Oct. 17, 2013

Related U.S. Application Data

(60) Provisional application No. 61/624,192, filed on Apr. 13, 2012.

(51) Int. Cl.
  *G06F 17/22*    (2006.01)
  *G06F 17/30*    (2006.01)
(52) U.S. Cl.
  CPC ................................ *G06F 17/30902* (2013.01)
(58) Field of Classification Search
  CPC .............................. G06F 17/22; G06F 17/2247
  USPC ......................................................... 715/234
  See application file for complete search history.

(56) References Cited

U.S. PATENT DOCUMENTS

| | | | |
|---|---|---|---|
| 6,094,662 A * | 7/2000 | Hawes ................................. | 1/1 |
| 7,386,614 B2 * | 6/2008 | Barritz ......................... | 709/226 |
| 7,412,535 B2 * | 8/2008 | Agarwalla et al. ............ | 709/236 |
| 7,426,534 B2 * | 9/2008 | Challenger et al. ........... | 709/203 |
| 7,430,597 B2 | 9/2008 | Kuwata et al. | |
| 7,509,393 B2 * | 3/2009 | Agarwalla et al. ............ | 709/217 |
| 7,587,515 B2 * | 9/2009 | Agarwalla et al. ............ | 709/238 |
| 7,730,154 B2 * | 6/2010 | Agarwalla et al. ............ | 709/217 |
| 7,987,239 B2 * | 7/2011 | Agarwalla et al. ............ | 709/217 |
| 8,032,586 B2 * | 10/2011 | Challenger et al. ........... | 709/203 |
| 8,307,277 B2 * | 11/2012 | Priestley et al. ............... | 715/234 |
| 8,595,648 B1 * | 11/2013 | Cordell et al. ................. | 715/818 |
| 2002/0174421 A1 * | 11/2002 | Zhao et al. ..................... | 717/174 |
| 2003/0128234 A1 * | 7/2003 | Brown et al. .................. | 345/744 |
| 2003/0187935 A1 * | 10/2003 | Agarwalla et al. ............ | 709/206 |
| 2003/0188009 A1 * | 10/2003 | Agarwalla et al. ............ | 709/236 |
| 2003/0188016 A1 * | 10/2003 | Agarwalla et al. ............ | 709/241 |

(Continued)

OTHER PUBLICATIONS

Configuring the proxy to ignore client no-cache headers; 2011; Websense, Inc. p. 1.*

(Continued)

*Primary Examiner* — Andrew Dyer
(74) *Attorney, Agent, or Firm* — Downey Brand LLP

(57) ABSTRACT

A method for improving backward and forward web browser performance is described. In one embodiment, backward and forward web performance is enhanced by ignoring unload handler scripts and caching web pages. Web elements with unload handler scripts are examined. In a first pass, if the web page elements are not determined to be significant, then the related unload handler scripts can be ignored, enabling the web page to be cached. In a second pass, if the web page element is significant, but the unload handler script is determined to be insignificant, then the unload handler script can be ignored and the web page can be cached.

18 Claims, 11 Drawing Sheets

(56) References Cited

U.S. PATENT DOCUMENTS

| | | |
|---|---|---|
| 2003/0188021 A1* | 10/2003 | Challenger et al. ............ 709/246 |
| 2003/0191800 A1* | 10/2003 | Challenger et al. ............ 709/203 |
| 2003/0191812 A1* | 10/2003 | Agarwalla et al. ............ 709/217 |
| 2007/0101061 A1* | 5/2007 | Baskaran et al. ............. 711/118 |
| 2008/0195628 A1* | 8/2008 | Kim et al. ........................ 707/10 |
| 2008/0215561 A1* | 9/2008 | Yu et al. ............................ 707/5 |
| 2010/0306642 A1 | 12/2010 | Lowet et al. |
| 2011/0066676 A1* | 3/2011 | Kleyzit et al. ................. 709/203 |

OTHER PUBLICATIONS

Caching with Rails: An overview; Feb. 22, 2009; Rubyonrails.org; pp. 1-7.*

Steve Souders; Cache them if you can; Mar. 22, 2012; SteveSouders.com; pp. 1-9.*

Gharabli et al.; [squid-users] Problem with HTTP Headers; Nov. 11, 2011; squid-cache.org; pp. 1-25.*

Varnish, caching and HTTP cookies; Nov. 16, 2011; opensourcehacker.com; pp. 1-9.*

Livshits, et al., "Spectator: Detection and Containment of JavaScript Worms," Annual Technical Conference on USENIX, 2008 pp. 1-27.

Chromium-reviews: Ignore JavaScript messages (alert/confirm/prompt) during unload handlers, Google Groups for Chromium.org, Mar. 7, 2011 pp. 1-5.

* cited by examiner

METHOD FOR IMPROVING BACKWARD/FORWARD PERFORMANCE BETWEEN CERTAIN TYPES OF DYNAMIC WEB PAGES

CROSS REFERENCE TO RELATED APPLICATIONS

This U.S. patent application claims priority under 35 USC 119(e) to U.S. Provisional Patent Application No. 61/624,192 filed Apr. 13, 2012 entitled "Method For Improving Backward/Forward Performance Between Certain Types of Dynamic Web Pages" by Eidson et al. which is incorporated by reference in its entirety for all purposes.

FIELD OF THE DESCRIBED EMBODIMENTS

The described embodiments relate generally to caching web content to improve browser performance. In particular, methods to improve the performance of backward and forward web page display through a web browser are described.

BACKGROUND

Web pages are widely used to distribute information though the internet and intranets to users possessing access to a network having connectivity, ultimately, to a web server storing and serving the web pages. Web pages have become a widely accepted vehicle for disseminating information because of the relative ease that web pages can be accessed by a wide variety of web viewing platforms. Of course personal computers can display web pages, but the ability to access web pages goes beyond personal computers to include laptop computers, personal digital assistants, net books, e-readers, smart phones, tablet computers and more.

Although once simple, web pages now can be relatively complex including items such as scripts, frames, embedded videos, embedded audio and the like. Such complexity can increase the response time of a web browser (browser) to the user. When a user first navigates to a relatively complex web page, the browser first must gather the web page data, interpret, construct and then display the web page. Conversely, when the user navigates away from a web page, the browser typically has to close resources and connections and terminate any running scripts before navigating away. In both cases, there may be a perceptible delay of a web browser to the user's commands. The response can be made worse by having a relatively less powerful processor or by accessing a relatively low performing network.

One way to improve user experience is to cache a web page prior to navigating away from it. By caching the web page, if the user navigates back to the cached web page, the displaying of the web page can occur relatively quickly since elements for the web page have been retained in the cache. Some web pages, however, are designed not to be cached. These web pages can be, for example, related to financial institutions where a web cache can present a security risk. Other web pages are not cached because they can have associated with them one or more scripts that are executed when the user navigates away. Sometimes, these scripts are not added by the web page author, but instead through third parties inserted as in-line advertisements or other web content. Honoring these scripts can reduce performance and degrade the user experience.

Therefore, what is desired is a way to enhance a browser's ability to cache web pages and improve the overall user experience.

SUMMARY OF THE DESCRIBED EMBODIMENTS

This paper describes various embodiments that relate to a computing system displaying web pages and methods to improve the rendering performance of web pages.

In one embodiment, a method for caching web page data for a requested web page that can be displayed through a web browser can include the steps of receiving web page data associated with the requested web page, and creating a first and a second document object model (DOM), where the second DOM is included in the first DOM. The second DOM can include unload handler scripts that prevent web page data from being stored in a cache. The unload handler scripts can be ignored when the second DOM is related to a third party, is not displayed or not visually significant.

In another embodiment, a method for determining when web page data can be cached can include the steps of receiving web page data for a requested web page, building a DOM of the web page where the DOM can include one or more unload handler scripts that prevent web page data from being cached when the load handler script is executed and ignoring the one or more unload handler scripts and caching the web page data when the unload handler script only affects local variables.

In yet another embodiment, a computer code executable by a processor in a computer system for caching web data used for constructing web pages can include computer code for receiving web page data associated with a requested web page, computer code for creating a hierarchical DOM from the web page data, computer code for examining DOMs included in the hierarchical DOM that include unload handler scripts that prevent a web page from being stored in a cache when the unload handler script is executed, and computer code for caching web page data and ignoring the unload handler scripts when the examined DOMs are related to a third party, are not displayed or are not visually significant.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION OF SELECTED EMBODIMENTS

Figure 1:
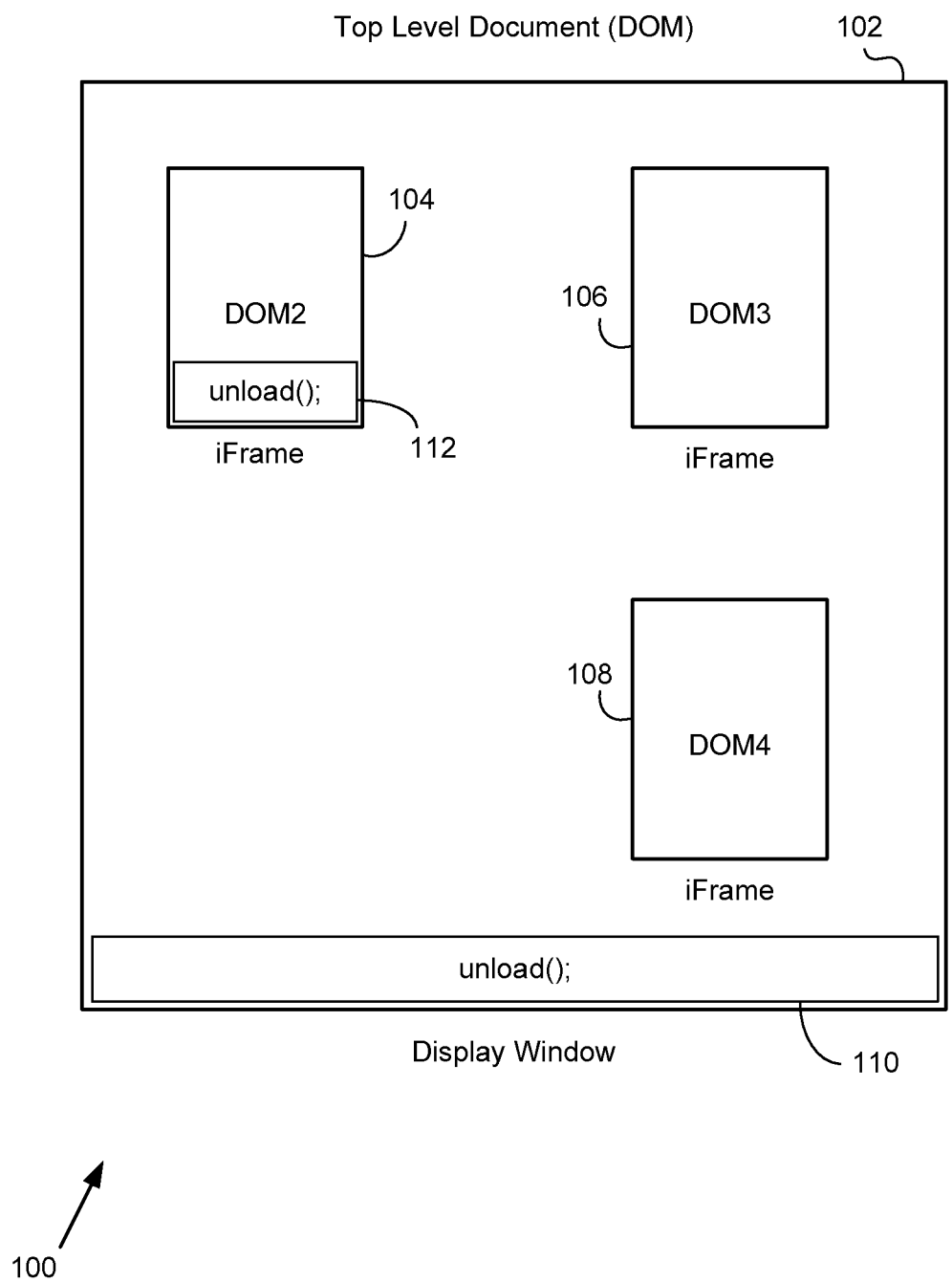
FIG. 1 is a graphical representation of an exemplary web page.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Although web pages can be typically stored and served as hyper-text markup language (HTML) files, the content of web pages can be made more complex by including scripts, frame content, embedded videos content and embedded audio content, and the like. As web page complexity increases, perceived performance of web browsing applications can decrease because of the extended time that may be required to assemble and display web pages. In order to improve browser performance, web page content can be placed into a web cache prior to a user navigating away from the web page. In this way, if the user navigates back to the previous page, the web page can be more quickly reassembled and displayed since the content is still in the web cache. In other words, the contents associated with the web page do not need to be again retrieved prior to re-displaying the page. Some web page elements, however, can negatively affect browser performance by requiring a web page not be stored in the web cache when the user navigates away from the page. Often these web page elements are third party elements that may not inserted by the author and can include software calls to particular scripts that can be executed when the user navigates away from the web page. By convention, the presence of these particular scripts precludes caching web page content. In one embodiment, these scripts are commonly referred to as unload hander scripts since they are executed as a web page is "unloaded" from view before navigating to a new web page.

In one embodiment, an unload handler script can be perform important duties that can be associated with the user's shopping cart. Alternatively, the unload handler script can perform relatively less important duties such as tracking and reporting information related to the user's behavior regarding web site visits to other parties. Oftentimes unload handler scripts are not provided by the web author, but can be requested by a third party through an inserted advertisement. Thus, some unload handlers can be relatively more important than others. Unload handler calls to unload handler scripts can be associated with any element on the web page. Web pages can be designed as hierarchical tree-like structures where elements of the web page can be instantiated as nodes, sub-nodes and the like. Therefore, an unload handler script can be associated with a top level object, or with one of the nodes or sub nodes in the web page.

To improve web browser performance, web page elements with unload handler calls and also actions of unload handler scripts with can be examined. If the web page elements are determined to be relatively unimportant, or if the actions associated with an unload handler script are determined to be relatively unimportant, then the unload handler call can be ignored, and the web page can be cached prior to navigating away. Thus, the web page can remain in a web cache and can be quickly reconstructed if the user navigates back.

In one embodiment, the HTML related to web page content can be retrieved. The HTML can be processed to form a document object model (DOM) representation of the web page that can include a top level DOM and secondary DOMs. If a web page includes at least one DOM with an unload handler, then the web page is typically not cached. The top level DOM (and by extension, the secondary DOMs) can be traversed and inspected using a two pass process. A first pass can look to exclude relatively unimportant DOMs (i.e., web elements) with unload handler calls from consideration as to whether to cache the web page. A second pass can look to exclude DOMs with relatively unimportant unload handler scripts from consideration as to whether to cache the web page.

In the first pass, a determination can be made with respect to each DOM in a web page that includes an unload handler call. In one embodiment, if a DOM is determined to be relatively unimportant, then the associated unload handler call can be ignored for that DOM. In one embodiment, the relative importance of a DOM can be determined by reviewing relationships of the DOM to the top level DOM. All the DOMs within a web page can be inspected. If the DOMs with unload handler calls are evaluated to be relatively unimportant, then the web page can be cached free of the burden of unimportant unload handler calls.

In the second pass, if there are DOMs that include unload handler calls that cannot be ignored (these are DOMs determined to be relatively important from the first pass), then the unload handler script for each of these DOMs can be examined. In one embodiment, the relative importance of the unload handler scripts can be evaluated and if the unload handler script is not relatively important, then the unload handler call for that DOM can be ignored. In one embodiment, relative importance can be determined by cross referencing unload handler actions with known and characterized unload handler actions.

FIG. 1 is a graphical representation 100 of an exemplary web page. Although web pages are frequently stored as HTML, many web pages can include many web elements beyond simple text and images. In some cases, these web elements can include a scripting language such as JAVASCRIPT™ from ORACLE™. A common abstraction to enable timely web page display is to construct a DOM representation of the web page. The DOM representation can be a hierarchal model that can represent elements on the web page as other DOMs instantiated in the top level DOM. For example, a web page can be shown as top level DOM 102 as shown in graphical representation 100. In this example, the web page can include three other web elements that can also be represented as DOMs within the top level DOM 102. A second DOM 104 is shown instantiated within DOM 102. Oftentimes, additional DOMs, such as second DOM 104, can be included in top level DOM 102 through the execution of a script. These scripts can incorporate the additional web elements (DOMs)

through inline-frames (abbreviated as iframes). The terms DOM, iframe and web element are used interchangeably in this document. In one embodiment, DOM 102 can also include two other DOMs: third DOM 106 and fourth DOM 108.

Top level DOM 102 can include an unload handler call 110. The unload handler call 110 can call a script that can, among other things, set a user location, contact a third party server not related to top level DOM 102 or track a user by setting cookies. Second DOM 104 can also include an unload handler call 112. In one embodiment, actions performed by unload handler call 112 can be distinctly different from the actions related to unload handler call 110. In other cases, the actions performed by unload handler call 112 can be similar to unload handler call 110.

It is important to note that DOM 102 is just a graphical representation of a web page. The DOM in general is just an abstraction to enable manipulation of web page data, images and other elements. Other abstract representations of top level DOM 102 exist, such as a DOM tree.

Figure 2A:
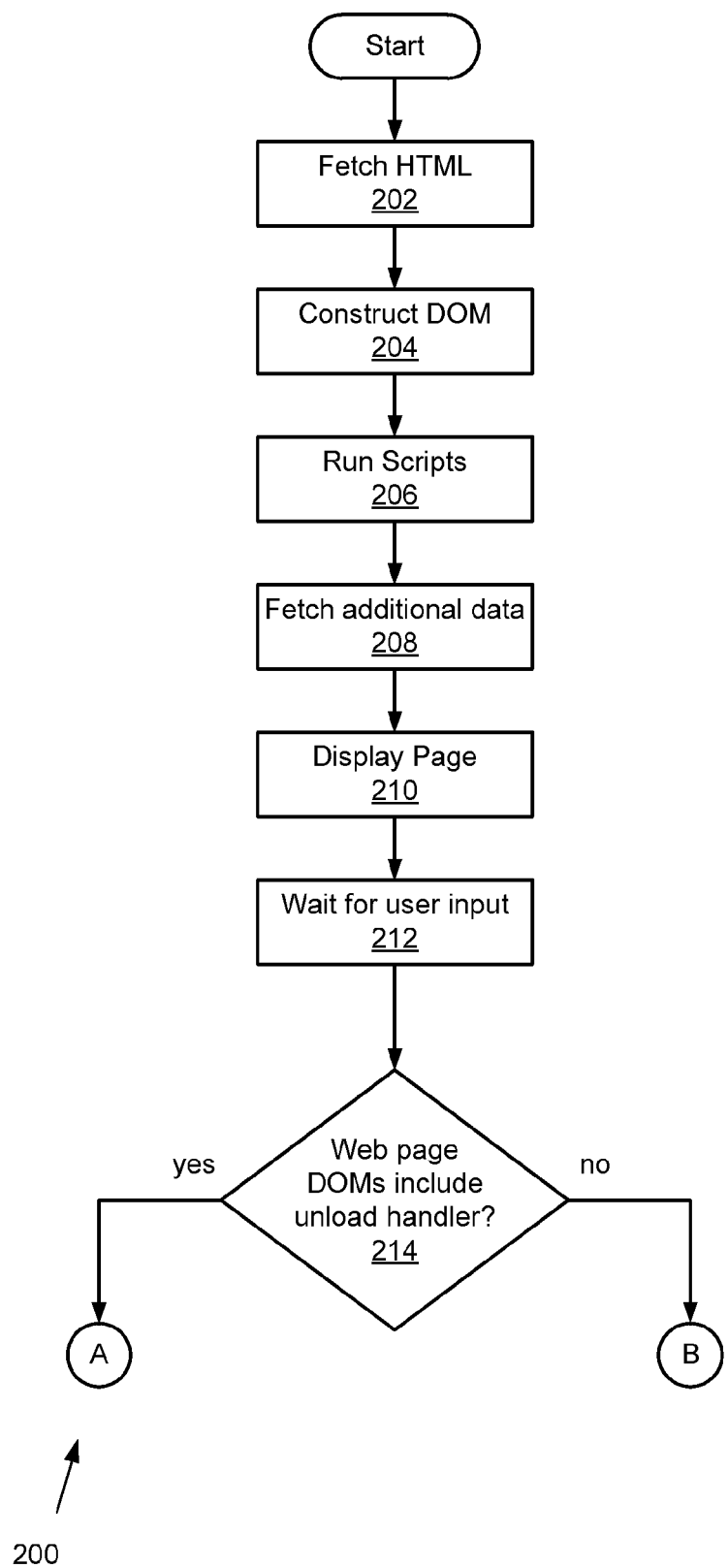
FIGS. 2A and 2B present a flow chart of method steps that a processor can execute to display and cache web pages.
Figure 2B:
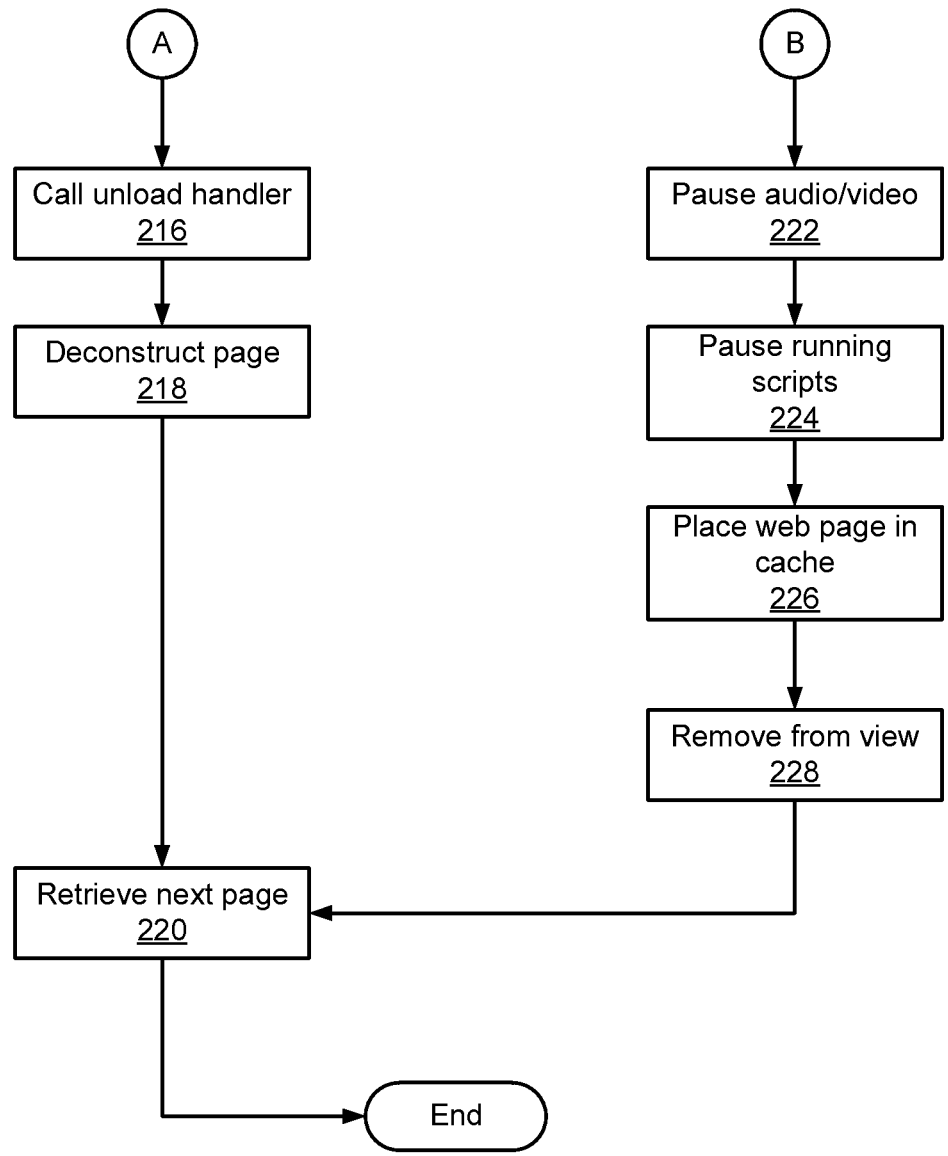

FIGS. 2A and 2B present a flow chart 200 of steps that a processor can execute to render and cache web pages. The processor can begin in step 202 by requesting and receiving data for a web page. Those skilled in the art will appreciate that web page data can be HTML, XML or other web data and can include scripts and style sheets as well. Often the HTML for a web page can include text, images, and references to other web elements. In step 204, the processor can construct a DOM of the web page to be displayed. The constructed DOM can be a top level DOM, similar to top level DOM 102 from FIG. 1. Included in the HTML, and therefore the constructed DOM, can be scripting language, such as JAVASCRIPT™. In step 206, scripts for the web page can be executed. Those scripts can be iframe scripts that can require more data to be retrieved before the web page can be rendered. For example, image data may be referenced in one of the iframe scripts. In some cases, a script may generate a frame and instantiate other web page data within that frame. The other web page data may not be coded in line with the HTML, but instead may be referenced directly or indirectly. In step 208, the other web page data can be retrieved. In step 210 the web page can be displayed to the user.

After the web page has been displayed, a processor can typically wait for user input in step 212. If the user decides to navigate away from the displayed web page, then the processor determines if the web page can be cached. In step 214, the processor can determine if a web page can be cached by checking if there are any unload handler calls within the web page. This can be done, for example, by inspecting all DOMs related to the web page and determining if any of these related DOMs include unload handler calls. If there are unload handler calls within the web page, then in step 216, the unload handler is called as required for the associated DOMs. In step 218, the web page is deconstructed and removed from view. In step 220, the next web page can be retrieved and the method ends.

Returning to step 214, if, on the other hand there are no unload handler calls, then in step 222, audio and video web elements can be paused (if any exist on the web page). In step 224, the processor can pause running any scripts and in step 226, the current web page can be placed into a web cache. The web cache advantageously allows the user to quickly return to this web page since all the web elements have already been retrieved and can be stored herein. Thus, the web page can be re-displayed relatively quickly. In step 228, the web page can be removed from view. The flow can proceed to step 220 and the next web page can be retrieved and the method ends.

In one embodiment, web page caching can be improved by selectively ignoring DOMs with unload handler calls. That is, a web page can be considered cache-able even when the web page can include DOMs with unload handler calls. In effect, step 214 can be expanded to include an inspection of DOMs that include unload handler calls. In one embodiment, all DOMs with unload handler calls can be examined. If the DOM is determined to be relatively unimportant, then the DOM can be removed from consideration as a DOM for a web caching decision. If after considering all DOMs with unload handler calls, and there are no relatively important DOMs, then the web page can be cached. In other words, if all DOMs with unload handler calls are determined to be relatively unimportant, then the related unload handler calls can be ignored and the web page can be cached.

Figure 3:
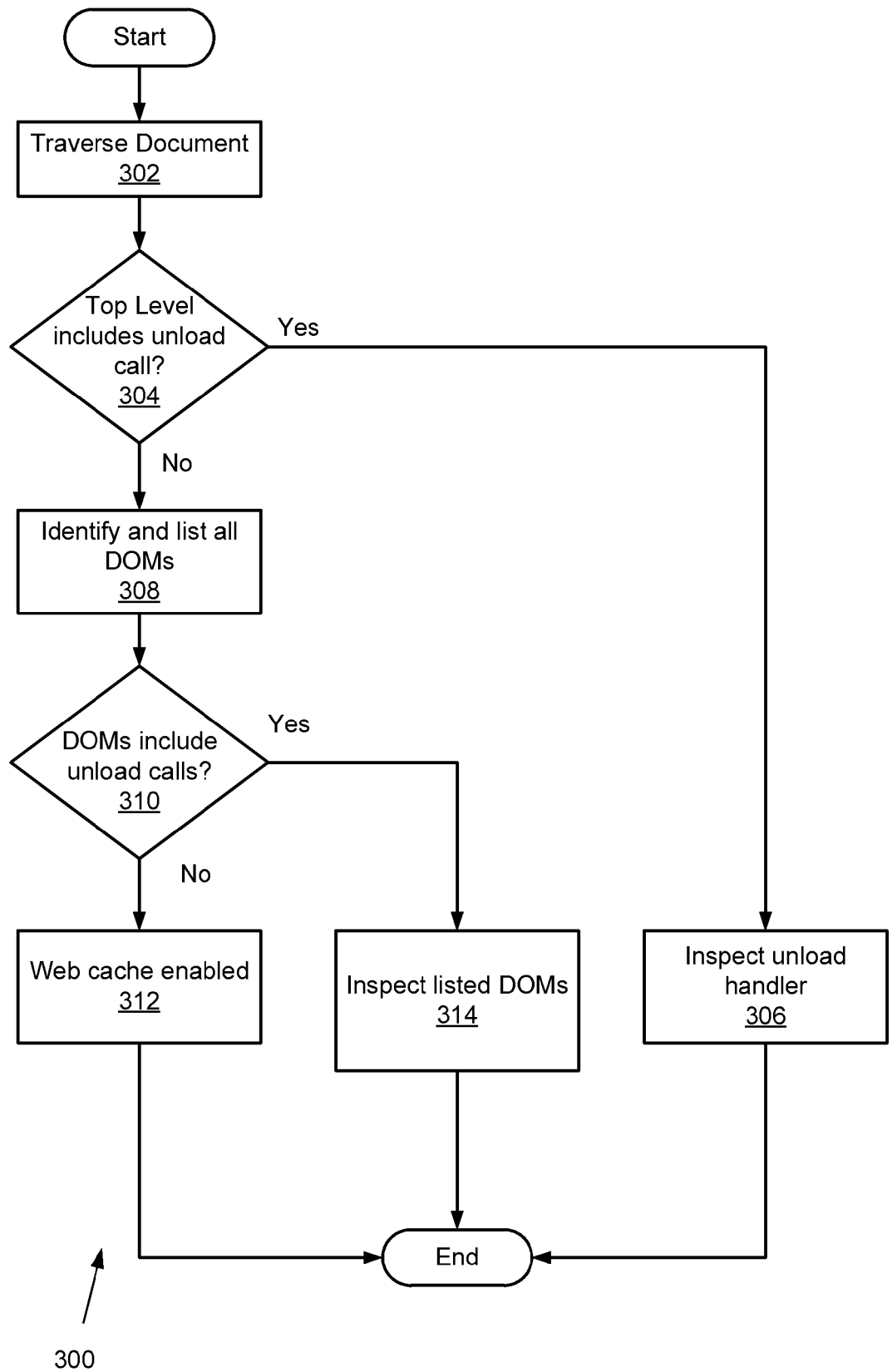
FIG. 3 is a flow chart of method steps for characterizing DOMs in a web page, in accordance with the specification.

FIG. 3 is a flow chart of method steps 300 for characterizing DOMs in a web page, in accordance with an embodiment described in the specification. Any DOMs including unload handler calls can be placed on a DOM list. In one embodiment, if there are no DOMs with unload handler calls, and then the processor can place the web content in a web cache. Persons skilled in the art will understand that any system configured to perform the method steps in any order is within the scope of this description. The method begins in step 302 when the processor traverses a web page document. In one embodiment, the web page can be represented in memory as a DOM. In another embodiment, the web page document can be a top level DOM. In step 304, the processor can determine if the top level DOM includes an unload handler call. If the top level DOM includes an unload handler call, then the method proceeds to step 306 where the unload handler script related to this unload handler call can be examined. Step 306 is described in more detail below in conjunction with FIGS. 6A and 6B. In some embodiments, step 306 can be optional. If step 306 is omitted, then the presence of an unload handler call at the top level DOM would preclude web caching and the method ends.

Returning to step 304, if the top level DOM does not include an unload handler call, then in step 308, the processor can create a list of all DOMs (a DOM list) that are included in the web page. In step 310, if all the DOMs on the DOM list do not include unload handler calls, then in step 312, the web page caching for this web page can be enabled and the method ends. Returning to step 310, if at least one DOM on the DOM list has an unload handler call, then in step 314 the list of DOMs is examined to determine if DOMs with the unload handler calls can be ignored and the method ends. This is described in more detail in conjunction with FIG. 4 below.

Figure 4A:
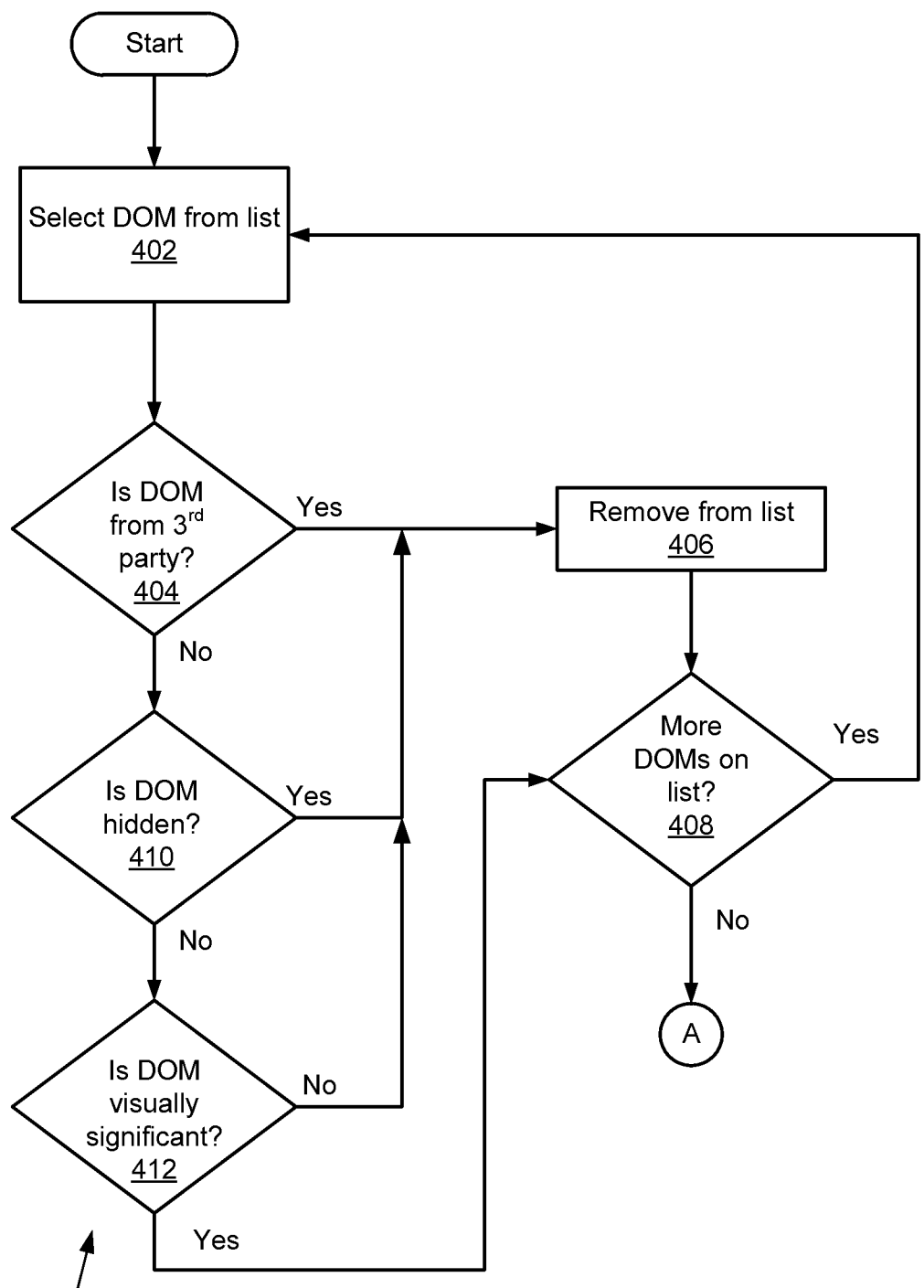
FIGS. 4A and 4B present a flow chart of method steps for determining if a DOM with an unload handler call can be ignored.
Figure 4B:
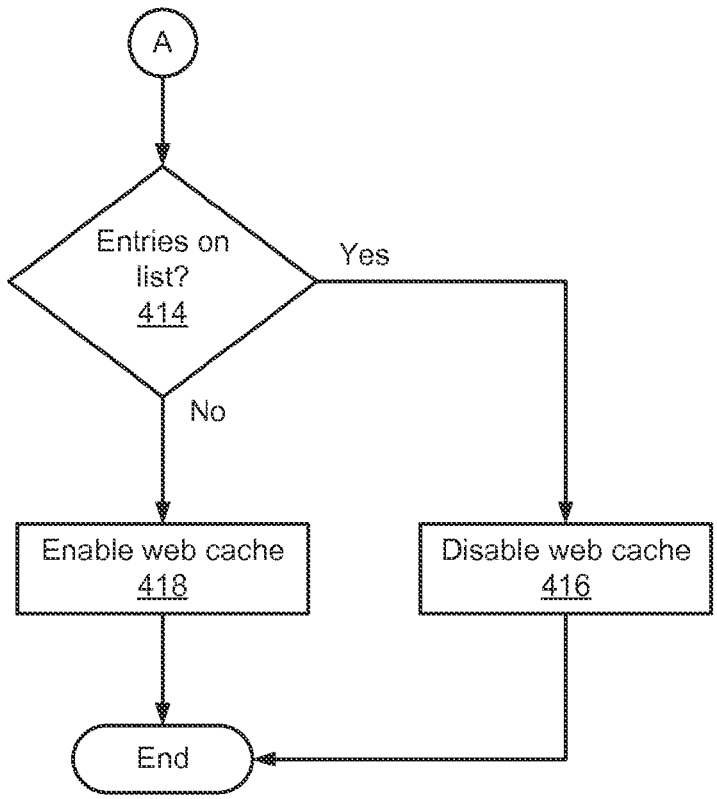

FIGS. 4A and 4B present a flow chart of method steps 400 for determining when a DOM with an unload handler call can be ignored. If all of the DOMs with unload handler calls can be ignored, then web caching can be enabled for the related web page. Each DOM on the DOM list can be examined in turn. If the DOM is determined to have a relatively lesser importance with respect to other web page content, then the DOM can be removed from the DOM list. After all DOMs have been examined, the DOM list can be reviewed. Any DOMs remaining on the DOM list can be considered relatively important, and therefore, the related unload handler calls can also be considered important and web-caching should be disabled for the particular web page. On the other hand, if the DOM list is empty, then web caching can be enabled.

The method begins in step 402 when a processor selects a DOM from the DOM list. In step 404, the selected DOM is examined to determine if the DOM is from or related to a third party. DOMs (web elements) can be inserted into web pages through various scripts. For example, some web elements can be inserted by a third party to add advertisements to a web page. Often such insertions are beyond the control of the web page author, but are controlled by a web host and sold for revenue. In those cases, the insertions are commonly advertisements sourced from a different domain, with respect to the domain of the web page. For example, if the web page (i.e., top level DOM) is related to a domain of XYZ.org, while the selected (examined) DOM is related to YYY.org, then the domain of the selected DOM can be considered to be related to a third party. Such third party DOMs may include unload handler calls that may not be considered important. As such, the processor can remove the selected DOM from the DOM list in step 406.

Figure 5A:
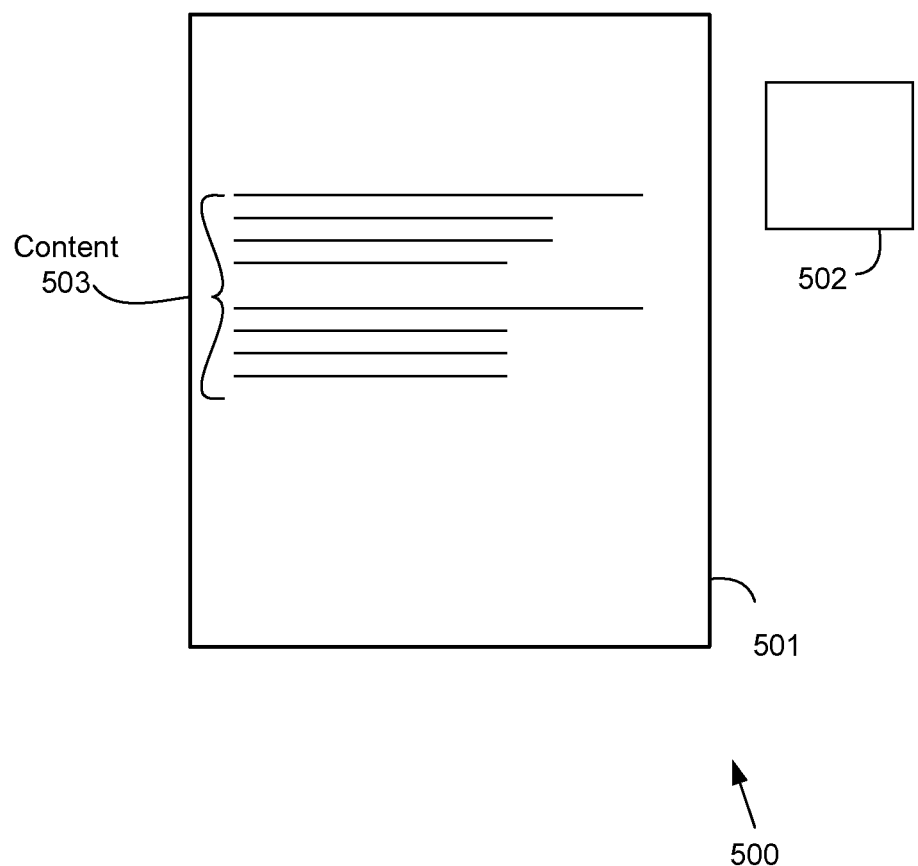
FIGS. 5A, 5B and 5C are graphical illustrations showing the relationship of top level DOMs to other DOMs in a web page.

Next, in step 408, the processor can determine if there are more DOMs to review on the DOM list. If there are more DOMs on the DOM list, then the method can return to step 402. Returning to step 404, if the selected DOM is not from, or related to a third party, then in step 410 the processor can examine the selected DOM to determine if it is hidden from view. Sometimes a DOM is inserted into a web page not to add visual content, but to enable the tracking of the web page user. For example, some inserted DOMs can include scripts to monitor the amount of time a user spends viewing a web page and then report back this statistic to another party. These DOMs can take the form of scripts that are executed, but not displayed to the web page and are instead hidden from view. A graphical representation 500 of a hidden DOM is shown in FIG. 5A. Top level DOM 501 can include content 503 and hidden DOM 502. Top level DOM 501 is rendered while hidden DOM 502 does not appear on the screen. If the selected DOM is hidden, then the method can return to step 406 and the selected DOM can be removed from the DOM list. If the DOM is not hidden, the in step 412, the processor can determine if the DOM is visually significant.

Figure 5B:
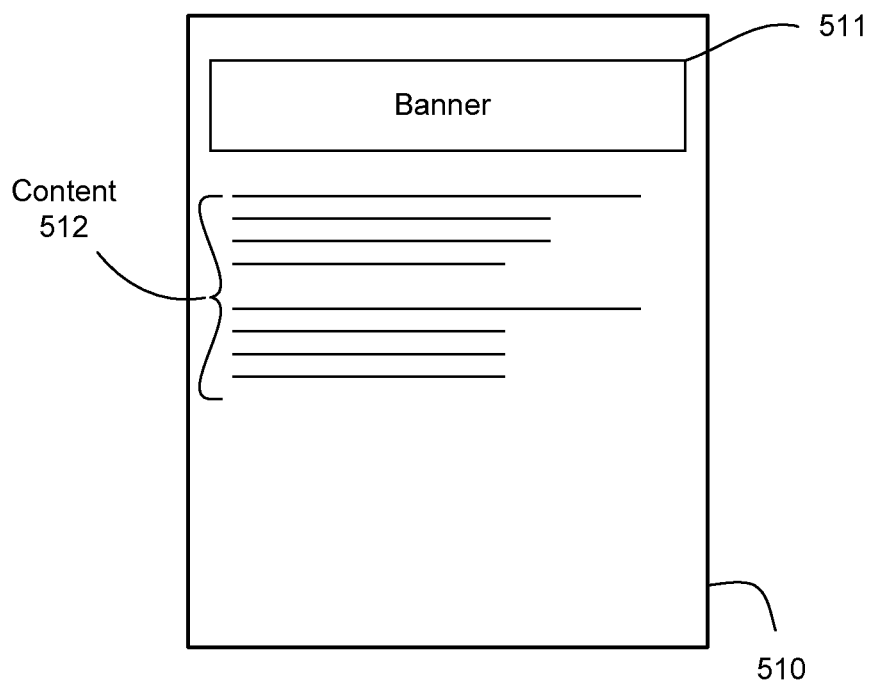

The visual significance of a DOM can have many different criteria. In one embodiment, a DOM can be visually significant if the selected DOM is a significant portion of the web page. For example, if the selected DOM is greater than or equal to 20% of the displayed web page, then the DOM can be considered to be visually significant. In other embodiments, other percentages may be considered. FIG. 5B is a graphical representation of a visually significant DOM. Top level DOM 510 can include content 512 and DOM 511. In this example, DOM 511 can be a banner. In this illustration, DOM 511 can be greater than or equal to 20% of the rendered web page, thus could be considered visually significant.

Figure 5C:
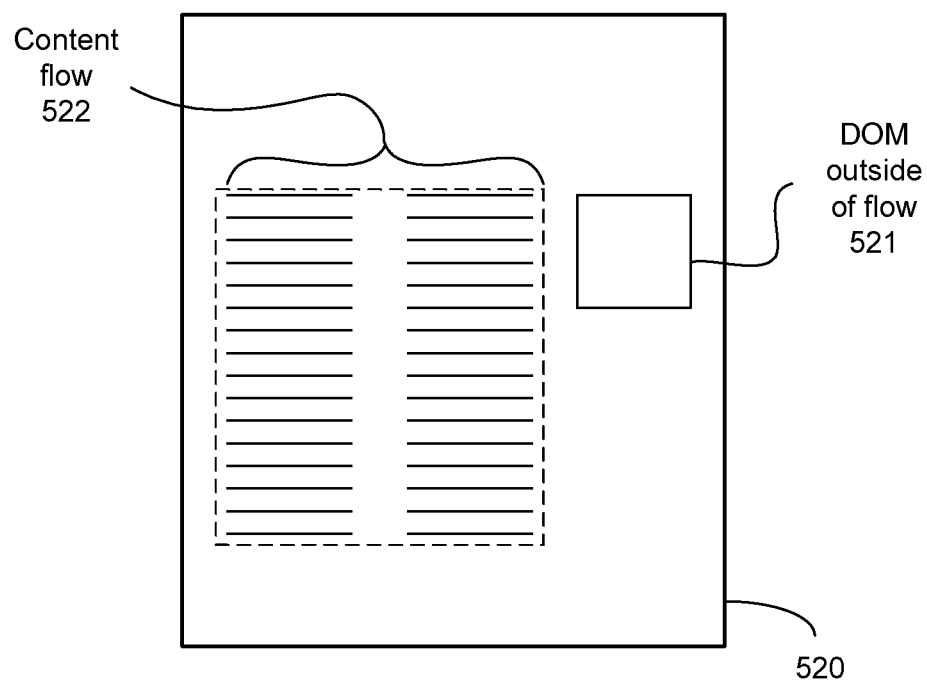

In another embodiment, the visual significance of a DOM can be determined by the DOM's relationship with the flow of the content on the web page. If the selected DOM is outside of the content flow, then the DOM is not considered visually relevant. FIG. 5C is a graphical representation of a DOM outside of the content flow. Top level DOM 520 can include content 522 and DOM 521. In this example, the content 522 is in two columns, and the flow of the content is shown within the dashed lines. DOM 521 is not included within the flow of content 522 and is not considered visually significant.

Returning to step 412, if the selected DOM is not visually significant, then in step 406, the processor can remove the DOM from the DOM list. On the other hand, if the DOM is visually significant, then in step 408, the processor determines if there are any more DOMs on the DOM list. If there are more DOMs on the DOM list to be considered, then the processor returns to step 402. On the other hand, if there are no more DOMs to be considered (in other words, all DOMs with unload handler calls have been reviewed to determine if the unload handler calls can be ignored), then a determination can be made regarding web caching. In step 414, the processor reviews the DOM list and determines if any entries remain on the list. If there are entries remaining on the DOM list, then in step 416 web page caching is disabled for the current web page and the method ends. On the other hand, if in step 414, the processor determines that the DOM list is empty, then in step 418 web page caching is enabled and the method ends.

In one embodiment, a second pass examination of the remaining DOMs on the DOM list can be made in an effort to enable web caching. The scripts that can be associated with and executed by an unload handler can be examined. There may be instances when even if a DOM has been determined to be relatively important, the scripts associated with the unload handler can be determined to be relatively unimportant. In those instances, the browser may ignore the unload handler call for that DOM.

Figure 6A:
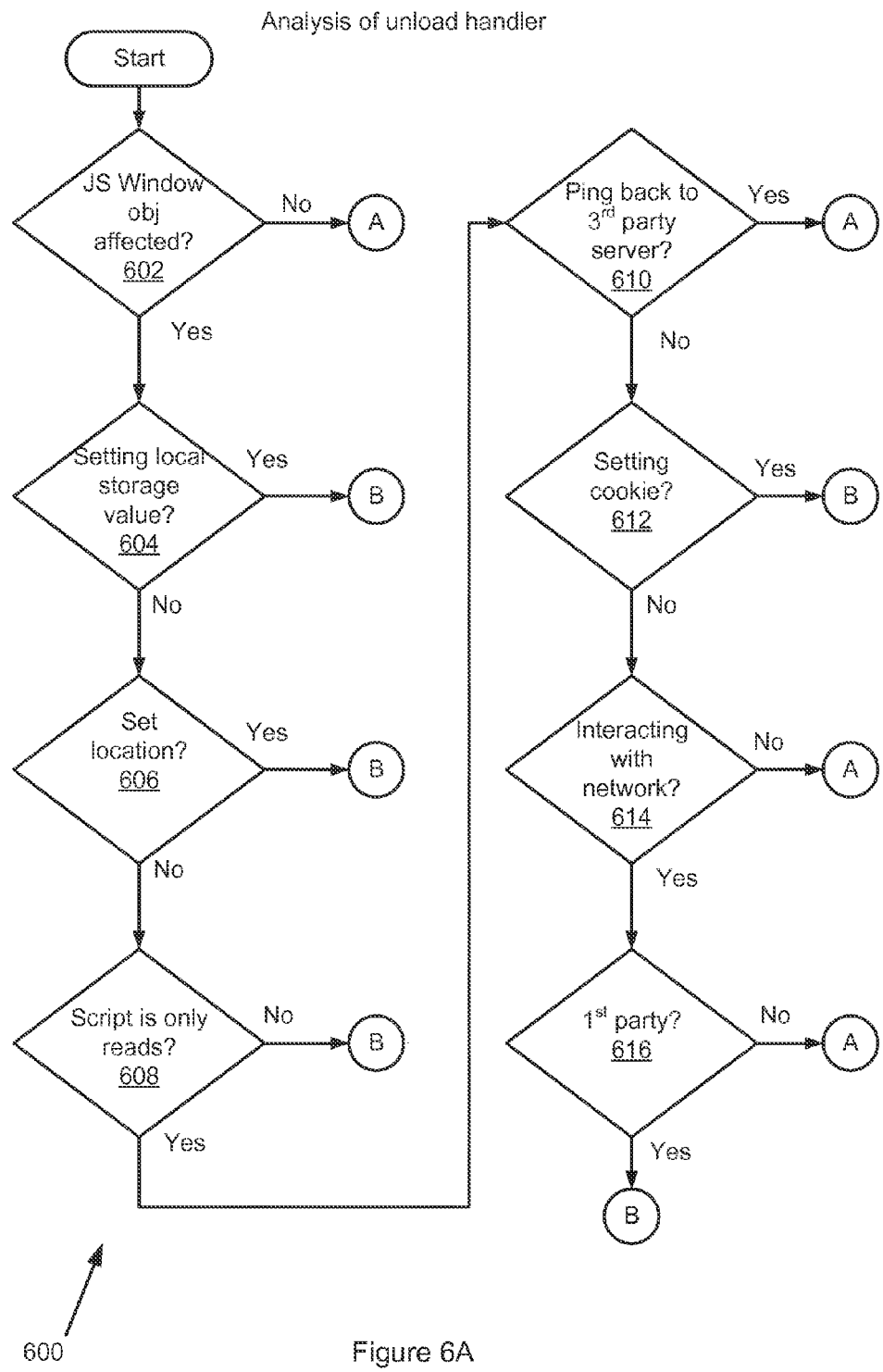
FIGS. 6A and 6B present a flow chart of method steps for analyzing scripts related to unload handlers.
Figure 6B:
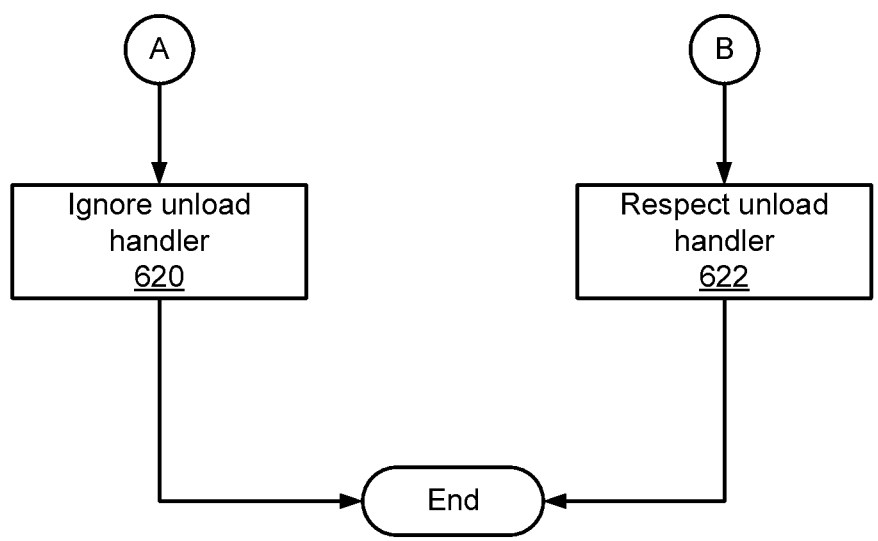

FIGS. 6A and 6B present a flow chart of method steps 600 for analyzing scripts related to unload handlers. In one embodiment, scripts for unload handlers can be written in the JAVASCRIPT™ language. In other embodiments, other scripts or languages may be executed in response to an unload handler call. The following description of the method makes reference to specific JAVASCRIPT™ terminology, but those skilled in the art can appreciate that the method can be applied to other languages in a similar manner. The analysis of the unload handler script begins in step 602 where the script is reviewed to determine if the script affects a top level object. If the script is written in JAVASCRIPT™ the script can reviewed to determine if the script affects the "window object". If the script does not affect the top level object, then the script can be considered relatively unimportant and in step 620 the unload hander script can be ignored, and the method ends. On the other hand, if the script does affect the top level object, the method can go on to further analyze the script. In step 604, the processor can examine the script to determine if the script affects a local storage value. If the script does affect a local storage value, then a determination can be made that the script is relatively important. Next, in step 622, the processor respects the unload handler script and the method ends. On the other hand if the script does not affect any local storage values, the method can proceed to step 606.

In step 606, the processor can determine if the script sets a location variable. If the script does set a location variable, then a determination can be made that the script is relatively important. The method can proceed to step 622 as described above. On the other hand, if the script does not set a location variable, then the processor can proceed to step 608 and determine if the script only performs variable reads. By performing only read commands, the script may not be performing any substantially important routines, and the unload handler can be ignored. If the processor determines that the script does not perform only variable reads (that is, the script performs reads and writes), then a determination can be made that the script is relatively important. The method proceeds to step 622 as described above. On the other hand, if the processor determines that the script only performs reads, then in step 610, the processor determines if the script contacts a third party server. As described above, a third party server can be a server that is not directly related to the domain of the web page. If the script does contact a third party server (a relatively unimportant action), then the method proceeds to step 620. On the other hand, if the script does not contact a third party server, then in step 612 the processor determines if the script sets a cookie value. A cookie, or web cookie, is a piece of data, typically text data, which a web site can set to enable the transfer of data between the server and the user. For example, the data can be order information (shopping cart) or user preferences. If the script does set a cookie value, then a determination can be made that the script is relatively important; the method can proceed to step 622 as described above. On the other hand, if the script does not set a cookie, the method can proceed to step 614.

In step 614, the processor can determine if the script interacts with a network. If the script does not use a network resource, a determination can be made that the script is relatively unimportant. The method can proceed to step 620 as described above. If, on the other hand, the processor determines that the script interacts with network resources, in step 616 the processor can determine if the network resource is a first party resource. A first party network resource is a resource that is directly related to the domain of the main web page. For example, if the web page is being served by XYZ Corporation at XYZ.org, then any network activity going to XYZ.org or related servers such as fred.XYZ.org, or printer.XYZ.org can be considered first party resources. If the network resource is a first party resource, then the method can proceed to step 622 and the method ends. On the other hand, if the network resource being used is not a first party resource, then the method can proceed to step 620 and the method ends.

In other embodiments, the method of FIGS. 6A and 6B can be expanded to examine the script further than what has been set forth here. As other behaviors of the unload handler script are understood, the method can be expanded to examine the script for the other behaviors. If such behaviors are determined to be relatively unimportant, then the processor can ignore the unload hander call associated with the script. On the other hand, if script behaviors are determined to be relatively important, then the unload handler call should be respected. The review of the unload handler scripts set forth in FIGS. 6A and 6B can provide a review of the actions of unload handler scripts associated with DOMs that are determined to be relatively important by the method described in FIGS. 4A and 4B. This second pass can potentially enable web page caching by allowing certain unload hander scripts to be ignored.

The method of FIGS. 6A and 6B effectively compare the actions of the unload handler script with known unload handler actions. In one embodiment, these known actions can be stored in a look up table realized in memory. In another embodiment, the known actions can be stored in a remote machine and periodically downloaded. In yet another embodiment, the known actions can be determined by user actions or inputs and stored locally.

Figure 7:
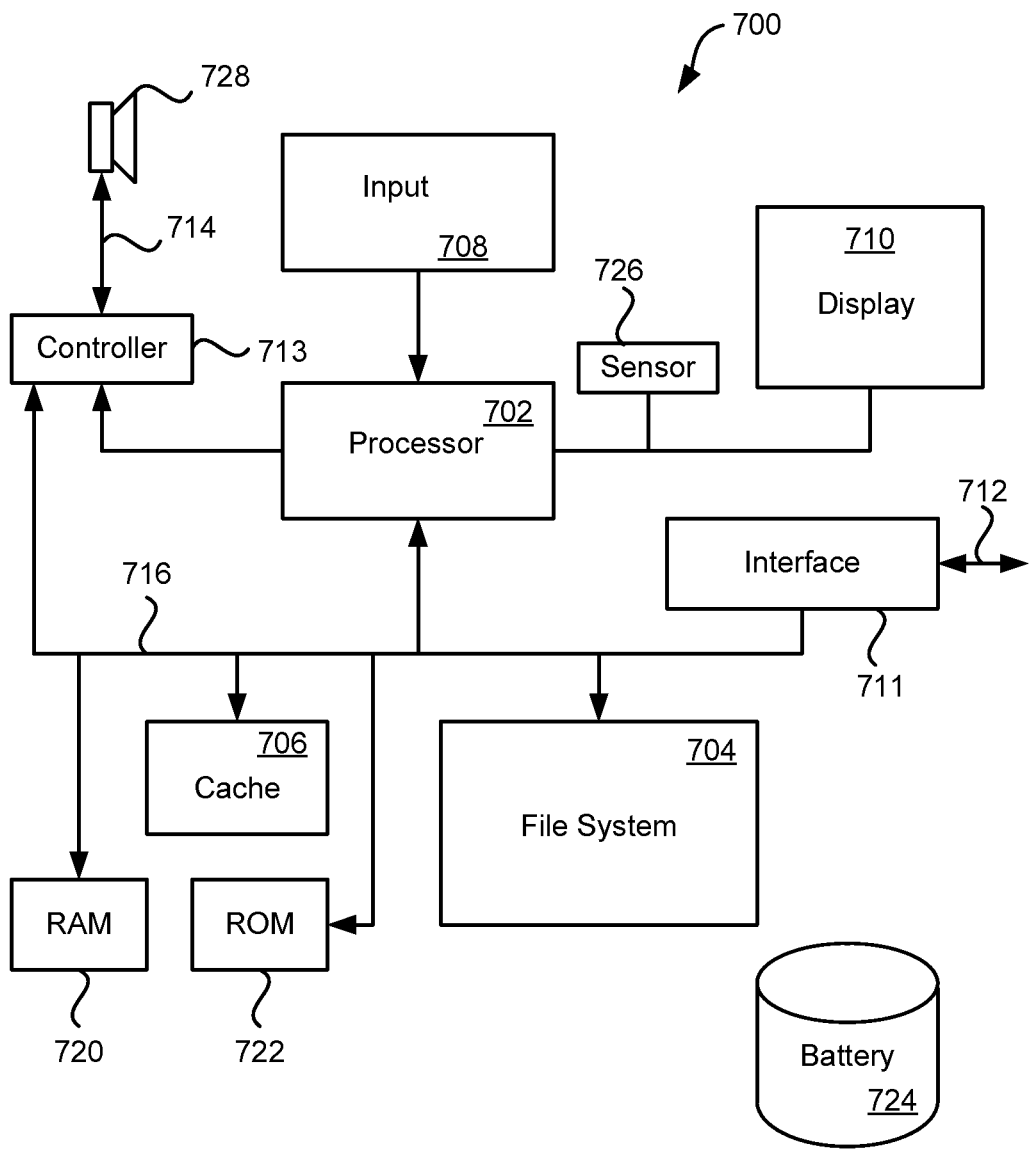
FIG. 7 is a block diagram of an electronic device suitable for controlling some of the processes in the described embodiment.

FIG. 7 is a block diagram of an electronic device suitable for controlling some of the processes in the described embodiment. Electronic device 700 can illustrate circuitry of a representative computing device. Electronic device 700 can include a processor 702 that pertains to a microprocessor or controller for controlling the overall operation of electronic device 700. Electronic device 700 can include instruction data pertaining to operating instructions, such as instructions for implementing a web browser, in a file system 704 and a cache 706. File system 704 can be a storage disk or a plurality of disks. In some embodiments, file system 704 can be flash memory, semiconductor (solid state) memory or the like. The file system 704 can typically provide high capacity storage capability for the electronic device 700. However, since the access time to the file system 704 can be relatively slow (especially if file system 704 includes a mechanical disk drive), the electronic device 700 can also include cache 706. The cache 706 can include, for example, Random-Access Memory (RAM) provided by semiconductor memory. The relative access time to the cache 706 can substantially shorter than for the file system 704. However, cache 706 may not have the large storage capacity of file system 704. Further, file system 704, when active, can consume more power than cache 706. Power consumption often can be a concern when the electronic device 700 is a portable device that is powered by battery 724. The electronic device 700 can also include a RAM 720 and a Read-Only Memory (ROM) 722. The ROM 722 can store programs, utilities or processes to be executed in a non-volatile manner. The RAM 720 can provide volatile data storage, such as for cache 706.

Electronic device 700 can also include user input device 708 that allows a user of the electronic device 700 to interact with the electronic device 700. For example, user input device 708 can take a variety of forms, such as a button, keypad, dial, touch screen, audio input interface, visual/image capture input interface, input in the form of sensor data, etc. Still further, electronic device 700 can include a display 710 (screen display) that can be controlled by processor 702 to display information, such as web pages, to the user. Data bus 716 can facilitate data transfer between at least file system 704, cache 706, processor 702, and input/output (I/O) controller 713. I/O controller 713 can be used to interface with and control different devices such as speakers, ear buds, microphone or video cameras through appropriate codecs. For example, control bus 714 can be used to control speaker 728.

Electronic device 700 can also include a network/bus interface 711 that couples to data link 712. Data link 712 can allow electronic device 700 to couple to a host computer or to accessory devices or to other networks such as the internet. The data link 712 can be provided over a wired connection or a wireless connection. In the case of a wireless connection, network/bus interface 711 can include a wireless transceiver. Sensor 726 can take the form of circuitry for detecting any number of stimuli. For example, sensor 726 can include any number of sensors for monitoring a environmental conditions such as for example a Hall Effect sensor responsive to external magnetic field, an audio sensor, a light sensor such as a photometer, computer vision sensor to detect clarity, a temperature sensor and so on.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be appar-

What is claimed is:

1. A method for caching web page data for a requested web page displayable through a web browser, the method comprising:
receiving the web page data associated with the requested web page;
creating a first document object model (DOM) from the web page data, the first DOM including at least a second DOM; and
examining the second DOM when the second DOM includes an unload handler script that prevents the web page data from being stored in cache, wherein examining the second DOM comprises:
determining whether the second DOM is related to a third party,
determining whether the second DOM is hidden in response to a determination that the second DOM is not related to the third party, and
when the second DOM is determined to be 1) related to the third party and 2) hidden:
determining that the unload handler script from the second DOM can be ignored,
ignoring the unload handler script from the second DOM in response to a determination that the unload handler script from the second DOM can be ignored, and
caching the web page data.

2. The method of claim 1, wherein the second DOM is related to the third party when the second DOM includes a second domain that is different from a first domain included in the first DOM.

3. The method of claim 1, wherein the second DOM is hidden when the second DOM is displayed off of a visual screen.

4. The method of claim 1, wherein examining the second DOM further comprises:
determining whether the second DOM is visually significant in response to a determination that the second DOM is not related to the third party, wherein the second DOM is visually significant when the second DOM is greater than or equal to a predetermined percentage of a displayed web page of the first DOM, and
determining that the unload handler script from the second DOM can be ignored in response to a determination that the second DOM is not visually significant.

5. The method of claim 4, wherein the predetermined percentage is 20%.

6. The method of claim 4, wherein the second DOM is visually significant when the second DOM is inside a content flow of the requested web page associated with the first DOM.

7. A non-transitory computer readable storage medium configured to store instructions that, when executed by a processor in a computing device, cause the computing device to cache web page data used for constructing web pages and displaying web pages through a web browser, by carrying out steps that include:
receiving the web page data associated with a requested web page;
creating a hierarchical document object model (DOM) from the web page data; and
examining one or more DOMs comprising at least one unload handler script that prevents the web page data from being stored in a cache when the at least one unload handler script is executed, wherein the one or more DOMs are included in the hierarchical DOM, and examining the one or more DOMs comprises:
determining whether at least one DOM of the one or more DOMs is related to a third party,
determining whether the at least one DOM is hidden from view in response to a determination that the at least one DOM is not related to the third party, and
when the at least one DOM is determined to be 1) related to the third party and 2) hidden from view:
determining that the at least one unload handler script associated with the at least one DOM can be ignored,
ignoring the at least one unload handler script in response to a determination that the at least one unload handler script associated with the at least one DOM can be ignored, and
caching the web page data.

8. The non-transitory computer readable storage medium of claim 7, wherein the at least one DOM is related to the third party when the at least one DOM includes a first domain that is different from a second domain for the hierarchical DOM.

9. The non-transitory computer readable storage medium of claim 7, wherein the at least one DOM is hidden from view when the at least one DOM is displayed off of a visual screen.

10. The non-transitory computer readable storage medium of claim 7, wherein examining the one or more DOMs further comprises:
determining whether the at least one DOM is visually significant in response to a determination that the at least one DOM is not related to the third party, wherein the at least one DOM is visually significant when the at least one DOM is greater than or equal to a predetermined amount of a displayed web page, and
determining that the at least one unload handler script associated with the at least one DOM can be ignored in response to a determination that the at least one DOM is not visually significant.

11. The non-transitory computer readable storage medium of claim 10, wherein the at least one DOM is not visually significant when the at least one DOM is less than 20% of the displayed web page.

12. The non-transitory computer readable storage medium of claim 10, wherein the at least one DOM is not visually significant when the at least one DOM is outside a content flow of the requested web page related to the hierarchical DOM.

13. A method for determining when web page data can be cached, the method comprising:
receiving the web page data for a requested web page;
building a document object model (DOM) representation of the requested web page, wherein the DOM representation includes one or more DOMs, and the one or more DOMs include one or more unload handler calls associated with one or more unload handler scripts that prevent the web page data from being cached when the one or more unload handler scripts are executed;
performing a first examination associated with a DOM list, wherein the DOM list includes the one or more DOMs, and the first examination includes:
examining each DOM in the DOM list to determine whether at least one unload handler call of the one or more unload handler calls that is associated with the DOM can be ignored, and updating the DOM list, wherein updating the DOM list comprises:
  removing, from the DOM list, at least one DOM of the one or more DOMs for which the at least one unload handler call can be ignored, and
  generating an updated DOM list that includes at least one other DOM of the one or more DOMs for which the at least one unload handler call cannot be ignored; and
performing a second examination associated with the at least one other DOM in the updated DOM list, wherein the second examination is performed after the first examination has been completed and includes:
  examining one or more actions associated with at least one unload handler script of the one or more unload handler scripts, wherein the at least one unload handler script is associated with the at least one unload handler call that is associated with the at least one other DOM,
  determining, based on the one or more actions, whether the at least one unload handler script can be ignored,
  ignoring the at least one unload handler script in response to a determination that the at least one unload handler script can be ignored, and
  caching the web page data.

14. The method of claim 13, wherein the one or more actions associated with the at least one unload handler script include setting a local storage value, and the method further comprises:
  determining that the at least one unload handler script can be ignored when the at least one unload handler script does not set the local storage value.

15. The method of claim 13, wherein the one or more actions associated with the at least one unload handler script include interacting with a network resource, and the method further comprises:
  determining that the at least one unload handler script can be ignored when the at least one unload handler script does not interact with the network resource.

16. The method of claim 13, wherein the one or more actions associated with the at least one unload handler script include performing read operations, and the method further comprises:
  determining that the at least one unload handler script can be ignored when the at least one unload handler script performs only read operations.

17. The method of claim 13, wherein the one or more actions associated with the at least one unload handler script include setting a cookie value, and the method further comprises:
  determining that the at least one unload handler script can be ignored when the at least one unload handler script does not set the cookie value.

18. The method of claim 13, wherein the one or more actions associated with the at least one unload handler script include contacting a server, and the method further comprises:
  determining that the at least one unload handler script can be ignored when the at least one unload handler script contacts the server that is not related to a domain of the at least one other DOM.

* * * * *